United States Patent [19]
Brown

[11] 4,016,784
[45] Apr. 12, 1977

[54] TOOL SETTING DEVICE

[75] Inventor: Raymond J. Brown, Clinton, Tenn.

[73] Assignee: The United States of America as represented by the United States Energy Research and Development Administration, Washington, D.C.

[22] Filed: Jan. 5, 1976

[21] Appl. No.: 646,705

[52] U.S. Cl. .................................. 82/2 R; 82/2 B; 82/14 B; 29/568; 90/DIG. 12

[51] Int. Cl.² ........................................ B23B 7/00

[58] Field of Search .................. 82/2 B, 2 R, 14 B; 33/181, 185; 29/568; 90/DIG. 12

[56] References Cited
UNITED STATES PATENTS

| 3,143,041 | 8/1964 | Namenyi-Katz | 82/2 B X |
| 3,524,130 | 8/1970 | Asmanse | 82/2 B X |
| 3,704,641 | 12/1972 | Rhoades | 82/2 B X |

Primary Examiner—Leonidas Vlachos
Attorney, Agent, or Firm—Dean E. Carlson; David S. Zachry; Earl L. Larcher

[57] ABSTRACT

The present invention relates to a tool setting device for use with numerically controlled machine tools, such as lathes and milling machines. A reference position of the machine tool relative to the workpiece along both the X and Y axes is utilized by the control circuit for driving the tool through its program. This reference position is determined for both axes by displacing a single linear variable displacement transducer (LVDT) with the machine tool through a T-shaped pivotal bar. The use of the T-shaped bar allows the cutting tool to be moved sequentially in the X or Y direction for indicating the actual position of the machine tool relative to the predetermined desired position in the numerical control circuit by using a single LVDT.

3 Claims, 3 Drawing Figures

TOOL SETTING DEVICE

The present invention relates generally to a device for accurately setting the reference position of a machine tool of a numerically controlled machine, and more particularly to a device wherein the position of the tool can be accurately set along both the X and Y axes by using a single linear variable displacement transducer. This invention was made in the course of, or under, a contract with the Energy Research and Development Administration.

In numerically controlled lathes and milling machines, a preprogrammed tape is used to command the machine tool, such as a boring bar or cutting tool, through a predetermined path. The tape commands are calculated with the machine tool being in an initial predetermined reference position. Thus, in order for the machine operation to be accurate, it must be established that the working edge of the tool is in the reference position prior to commencing the machining operation. Frequently, it is also necessary to return the tool to the reference position to determine if the tool must be repositioned in the tool holder or be replaced due to excessive wear or changes in the machine tool configuration.

There are presently available several mechanisms for positioning the machine tool in the reference position. For example, one mechanism found satisfactory for use with numerically controlled machines for such positioning of machine tools is a linear variable displacement transducer (LVDT) which is positioned in a known location on the machine and the machine tool advanced thereagainst in order to place the tool in the reference position.

The LVDT's generally employed in such operations use a stylus or core movable in a low-friction, sleeve-type bearing when contacted by the machine tool. Inside the transducer body is a core of magnetic material which is attached to the stylus and moves freely within a cylindrical coil form when the stylus is displaced. Three coils are wound in the coil form, the primary coil in the center and the secondary coils on either side thereof. Thus, when the primary coil is excited with a sinusoidal voltage, another sinusoidal voltage is induced on both secondary coils so that as the core in moved within the coil form by displacing the stylus the magnetic coupling between the primary coil and the secondary coils varies, causing the induced voltages of the secondary coils to vary. When the secondary coils are connected in series opposition, the resulting output voltage is the difference between these two induced voltages. For a particular stylus position, e.g., the null position, the output voltage is at a minimum or zero. Normally, the LVDT's are coupled to a suitable voltage meter through an amplifier and include indicia showing the relative position of the stylus with the null position being the position normally used for setting the machine tool in the reference position. The phase angle between the input voltage and the output voltage changes 180° when the stylus passes through the null position so that the meter may be used to read whether the displacement of the stylus is nearing or passing through the desired null position.

The utilization of LVDT's in numerically controlled machines for tool setting purposes suffers several shortcomings which detract from their use. For example, in order to provide a reading indicative of tool position when the latter is displaced in either the X or Y direction necessitates the use of a plurality of LVDT's. Normally, three such LVDT's are employed with one of them providing a reading in the one direction, e.g., along the Y axis, while the other two LVDT's are positioned 90° therefrom for determining the tool position in either X direction so as to allow the machine to be used on workpieces requiring machining on inside and outside contours thereof. Inasmuch as several LVDT's are required for each machining operation, utilizing multiple axis tool movement, the LVDT's are usually encased in a single housing. However, such an arrangement of the LVDT's is disadvantageous because it limits the tool setting device to a rather limited range of tool sizes which may necessitate repositioning of the tool holder and also imposes a substantial restriction on the length of the cross slide available for machine operation.

Accordingly, it is the primary aim or goal of the present invention to minimize or obviate the above and other shortcomings encountered in using LVDT devices for the precise positioning of machine tools along X and Y coordinates. This goal is achieved by employing a tool setting device having a single LVDT and a pivotal T-shaped member located in a contiguous relationship with the stylus of the LVDT, so that when the pivotal member is contacted by a tool being moved in either the X or Y direction the pivotal member rotates about the axis and displaces the transducer stylus for indicating tool position. The tool setting device of the present invention employs only a single LVDT as compared to three LVDT's for the most commonly used type tool setters so as to result in a substantially lower cost, greater reliability, smaller size, and a less complex interfacing arrangement with the machine controller. Further, the device of the present invention substantially minimizes the machine travel required to position a tool when changing from an inside contour tool setting to an outside contour tool setting, or vice versa. Also, the subject tool setter can be used with a considerably greater number to tool types and sizes since the force required for displacing the pivotal member and the stylus coupled thereto is relatively low.

Other and further objects of the invention will be obvious upon an understanding of the illustrative embodiments about to be described, or will be indicated in the appended claims, and various advantages not referred to herein will occur to one skilled in the art upon employment of the invention in practice.

Two embodiments of the invention have been chosen for the purpose of illustration and description. The embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated. While the embodiments illustrated show the tool slide as moving in the X direction and the machine spindle moving in the Y direction, it is to be understood that the tool slide can be displaced in both the X and Y directions. Also, while the machine tool is illustrated as being used with a lathe, it will appear clear that the invention is useful on other machines, such as milling machines, drill presses, or other automated machines in either a vertical or horizontal orientation where a zero or reference position is required for proper machining functions.

Figure 1:
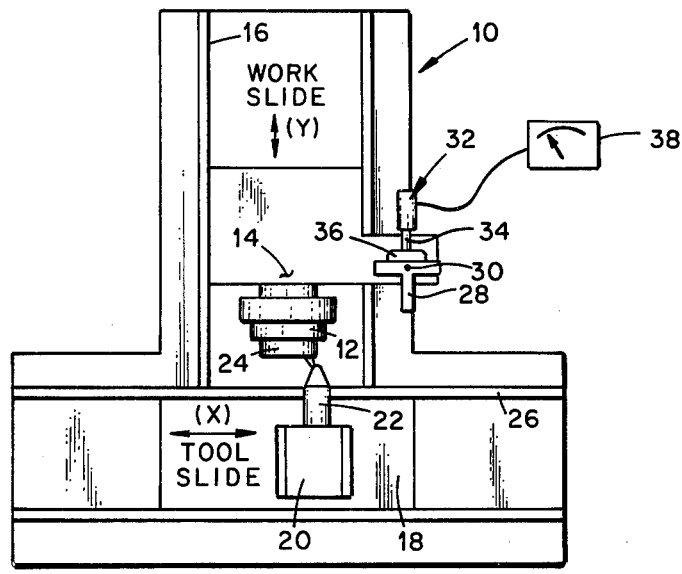
FIG. 1 is a perspective illustration showing in schematic form the LVDT device of the present invention.

With reference to the accompanying drawing, the invention is shown being employed on a numerically controlled machine generally indicated at 10 which, for the purpose of this description, is a lathe comprising a workpiece holder 12, such as a geared chuck mounted on a spindle 14 adapted for rotation by a suitable driving means, not shown, and including a suitable work slide or carriage 16 for supporting the spindle and displacing the latter in a suitable manner along the Y axis, as shown. The lathe 10 also includes a suitable tool slide 18 for supporting a tool post 20 with a cutting tool 22 in a machining relationship with a workpiece 24. As shown, the tool slide 18 is adapted for translation in an X direction along way 26. The movement of the tool slide 18 or the spindle 14 along their respective ways is accomplished in any suitable fashion, such as by employing electrical driving motors controlled by the machining circuit.

As shown in FIG. 1, the LVDT device of the present invention consists essentially of a pivotal member 28 of a generally T-shaped configuration and which is affixed to the spindle housing adjacent the lathe so as to be in a location easily accessible by the tool. However, this mounting may be at any other location on or near the lathe or other machine. The T-shaped member 28 is affixed to the lathe bed by a suitable pin or rod which is generally indicated at 30. The coupling between the rod 30 and the T-shaped member 28 is suitably bushed so that the T-shaped member may easily rotate or pivot about an axis provided by the rod 30. The LVDT as generally shown at 32 is, in turn, secured to the machine bed by a suitable attachment, not shown. The stylus 34 of the transducer 32 projects directly towards the rod 30 of the T-shaped member and is provided with a small head 36 which abuts against the T-shaped member 28. Rotation of the T-shaped member 28 about the axis provided by rod 30 will displace the stylus 34 into the LVDT 32 to provide a voltage reading on meter 38 indicative of the stylus displacement and the tool position.

Figure 3:
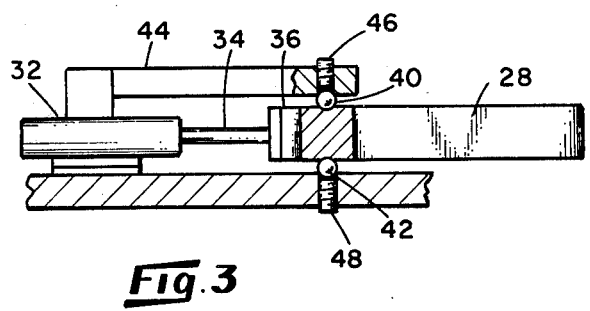
FIG. 3 is a view, partly broken away, showing a variation in the mounting, for the tool setting device.

Alternatively, and preferably, the T-shaped member 28 is mounted on the lathe bed by employing a bearing mount as shown in FIG. 3. The bearing mount is provided by positioning single ball bearings 40 and 42 above and below the T-shaped member 28 in a plane corresponding to that provided by pin 30 in the FIG. 1 embodiment. These bearings are seated in suitable indentures in the T-shaped member and the lathe bed. The upper bearing is maintained in position by a support 44 extending from the fixed LVDT 32. The bearings are held against the T-shaped member 28 by adjustable bias means, such as spring means or the screws 46 and 48 as shown, which threadably engage the lathe bed and the support 44.

Figure 2:
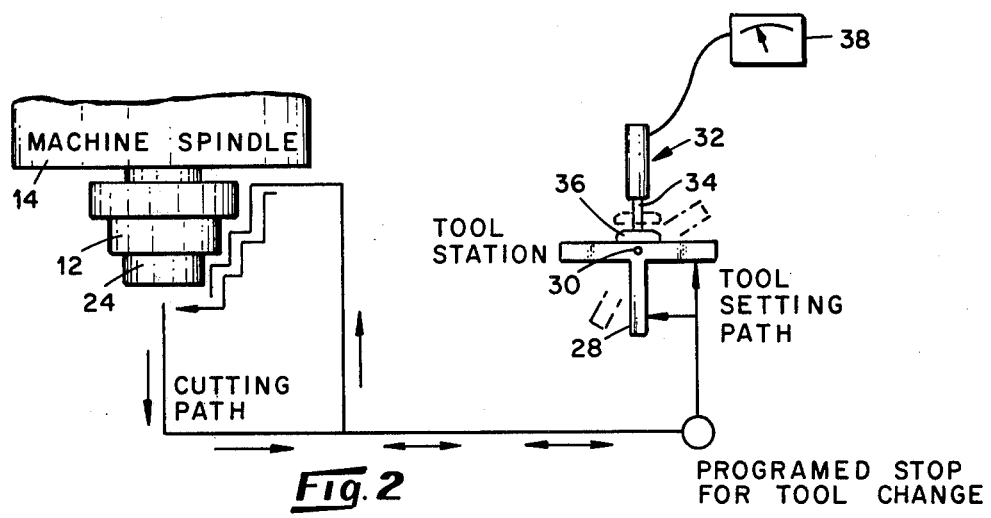
FIG. 2 is a schematic diagram showing a typical path followed by a cutting tool which is initially positioned by employing the tool setting device of the present invention.

In FIG. 2, a typical programmed cutting path is shown for illustrating the accuracy which can be obtained with the present invention for an X–Y cutting path. Typically, the X axis machine slide 18 is activated to position the tip of the cutting tool 22 close to the surface of the T-shaped member 28. The tool 22 is then advanced slowly along the X axis until a reading of zero or the null position is indicated on a meter 38. This procedure is then repeated for the Y axis. In either event, as shown in FIG. 2, the movement of the tool against the T-shaped member in either the X or Y direction rotates the T-shaped member about its axis so as to displace the transducer stylus 34 and thereby provide the reading on the meter 38 indicative of the tool position. By utilizing the T-shaped member or a reasonable facsimile thereto, the cutting tool may be actually engageable with at least six surfaces provided by the T-shaped member so as to provide a reading on the meter 38 indicative of tool position. As pointed out above, it is essential that the initial position of the cutting tool be established for accurately machining the workpiece attached to the chuck of the lathe. Establishing such a tool position is also essential in the course of machine operation where it is necessary to replace or realign the cutting tool.

It will be seen that the present invention provides a relatively simple but highly accurate tool setting device which does not require a linear relationship between the movement of the tool against the pivotal member and the head or the stylus of the transducer. In fact, the axis or the tool may contact the T-shaped member at any location thereon even though the movement at the outermost ends thereof will require a greater displacement in order to obtain a null voltage reading than at a location closer to the axis of rotation. If such contact is made near the outer end or at any location on the T-shaped member, the portion of a T-shaped member disposed 90° therefrom should be contacted at the same location thereon so that the tool position may be accurately determined. The axis for rotation of the pivotal member is located so that a cam-like relationship exists between the latter and the stylus of the transducer. This non-linear relationship may be advantageous since it provides a simple means for adjusting sensitivity of the transducer.

What is claimed is:

1. A machine tool setting device for use with a numerically controlled machine utilizing a machine tool in an X-Y axes coordinate system for machining a workpiece, consisting of a single linear variable displacement transducer having a displaceable stylus projecting therefrom, a T-shaped member having an axis of rotation in line with and perpendicular to the plane of displacement of said stylus, said T-shaped member being disposed in a contiguous relationship with said stylus for displacement thereof in response to contact of the T-shaped member with said machine tool during relative movement therebetween in either the X or Y direction, and voltage responsive means coupled to said transducer for indicating the actual position of the machine tool along the axis the relative movement is occurring relative to a predetermined desired tool position along the same axis.

2. The machine tool setting device claimed in claim 1, wherein the axis of rotation of said T-shaped member is provided by a rod extending through the T-shaped member and attached to the numerically controlled machine, and wherein the contact between said stylus and the T-shaped member is provided by a head carried by said stylus and abuttable against the T-shaped member.

3. The machine tool setting device claimed in claim 1, wherein the axis of rotation of said T-shaped member is provided by single ball bearings positioned on opposite sides of the T-shaped member in a common plane, bias means are in contact with said ball bearings for maintaining them in position with said T-shaped member.

* * * * *